US007570786B2

(12) United States Patent
    Ateya

(10) Patent No.: US 7,570,786 B2
(45) Date of Patent: Aug. 4, 2009

(54) AUTOMATIC DIGITAL OBJECT COUNTING AND VERIFICATION SYSTEM AND ASSOCIATED METHOD

(76) Inventor: Antoun Ateya, 7 Oak Meadow Trail, Pittsford, NY (US) 14534

( * ) Notice: Subject to any disclaimer, the term of this patent is extended or adjusted under 35 U.S.C. 154(b) by 886 days.

(21) Appl. No.: 10/929,293

(22) Filed: Aug. 30, 2004

(65) Prior Publication Data
    US 2006/0045323 A1    Mar. 2, 2006

(51) Int. Cl.
    *G06K 9/00*    (2006.01)
    *B65B 1/04*    (2006.01)
(52) U.S. Cl. ........................ 382/103; 221/129
(58) Field of Classification Search ............ 382/103, 382/107, 143, 149, 190, 192; 53/244; 221/92, 221/123, 129; 702/128
    See application file for complete search history.

(56) References Cited
    U.S. PATENT DOCUMENTS
    6,535,637 B1    3/2003    Wootton et al.
    6,574,580 B2    6/2003    Hamilton
    6,592,005 B1 *  7/2003    Coughlin et al. ............ 221/129
    6,610,973 B1    8/2003    Davis, III

* cited by examiner

*Primary Examiner*—Duy M Dang
    (74) *Attorney, Agent, or Firm*—Thomas R. FitzGerald; Hiscock & Barclay, LLP

(57) ABSTRACT

A system for automatic counting of non-overlapping objects irrespective of shape, size, and color is provided by imaging and computer subsystems. Objects to be counted are placed on a transparent surface disposed on a diffusing surface uniformly irradiated by electromagnetic radiation sources. Low intensity object shadows and high intensity object background regions are digitally imaged. The digital image is converted by a computing unit to a binary image and subjected to the Distance Transform to determine a count of the objects. Object identification verification is provided by comparing identification information obtained from a bar code associated with a supply container of the objects and identification information obtained from a digitally imaged written request.

28 Claims, 4 Drawing Sheets

300

| | CCD-based Digital Camera | Lens and Photodiode Linear Arrays |
|---|---|---|
| Continuous Exposure | - Manual Tray<br>- Stop/Go Conveyor<br>- Stop/Go Rotary | - Moving Conveyor<br>- Moving Rotary |
| Short Duration Flash Exposure | - Manual Tray<br>- Moving Conveyor<br>- Moving Rotary | N.A. |

Columns: Object Imaging Methods
Rows: Object Irradiation Methods

FIG. 3

AUTOMATIC DIGITAL OBJECT COUNTING AND VERIFICATION SYSTEM AND ASSOCIATED METHOD

TECHNICAL FIELD

This invention relates in general to automatically counting and verifying objects, and in particular, to automatically counting non-overlapping objects and verifying the identification of the counted objects by employing a digital imaging unit connected to a computing unit.

BACKGROUND OF THE INVENTION

Many applications, including the handling of pharmaceutical pills and capsules, include a counting of objects. Assessments of object counting techniques focus on various aspects, including accuracy, speed, cost, and reliability. Object counting methods can be placed into three broad categories: (1) manual methods; (2) semi-automated methods; and (3) automated methods.

The manual methods include, for example, taking a quantity of the desired objects from a bulk supply container, placing them onto a surface, and separating the desired number of objects using a combination of human manual skills and human perception. This counting process can include counting the objects individually or counting multiples of a single object. When used extensively, this manual counting approach is monotonous and stressful, thereby resulting in human error and inaccurate counts. Such inaccuracies are particularly undesirable when large numbers of costly objects (e.g., pharmaceutical pills) are being counted, and may have costly legal implications.

The semi-automated methods rely on counting the objects in larger quantities, such as pre-packaged dozens or as a fully, or partially, filled tray where the tray includes an array of bins. The savings in time resulting from pre-packaging the larger quantities is countered by the cost of packaging and possible errors associated with the packaging process itself. Furthermore, the need to count quantities that are not a multiple of the pre-packaged amount (e.g., a dozen) adds human involvement and hence results in human counting error. Trays possessing bin arrays are available in the marketplace. They can be efficient, low-cost and free of counting errors, if the desired count is a multiple of the full capacity of the tray, provided that only a single object occupies each bin in the tray. The conditions of counting using a full tray and a single object in each bin are not satisfied all the time. Thus, human involvement and the resulting counting errors are again introduced.

The automatic counting methods can be subdivided into the following groups:
 (1) "Feed and Sense" methods, where the objects are fed, one-at-a-time, past one or more sensors.
 (2) "Global" methods, where a priori knowledge of a measurable property or attribute of an individual object is compared to the cumulative or "global" measured attribute of a few similar objects.
 (3) Feature, or attribute, based inspection and identification by comparison to a database of features or attributes.

The "feed and sense" counting techniques are typically configured using one of a variety of combinations of object feeding methods and object sensing methods. Object feeding, for example, can be accomplished by gravity, mechanical vibration, belt transport, air stream, and friction force. On the other hand, examples of object sensing, or counting methods, include: (1) rotating gates whose rotation shaft is attached to a mechanical counter; (2) an optical source and its matched photo-detector pair producing different detector output signals by the presence or absence of an object between the source and the detector; (3) an on/off electromechanical switch triggering a voltage signal when an object passes by; and (4) a proximity switch detecting the presence or absence of metallic objects passing by the switch.

Many of the existing automatic dispensing systems rely on "feed and sense" counting systems, which are configured with one of the combinations of feeding and sensing methods described above. In order to ensure accurate counting, most of these systems rely on feeding the objects past a sensor, one-at-a-time, often using sophisticated mechanisms and configuration geometries. Feeding objects one-at-a-time is the most challenging part of building a counter. The lack of accurate counting is usually a result of the failure to reliably feed single objects past the sensing element. Furthermore, broken objects and foreign objects add another challenge to these counting methods. A broken object, for example, will be counted by these systems as two objects, unless size information is made available to aid in the decision to count the broken parts or ignore them. Also, a foreign object, mixed with the desired objects, can accidentally pass through the counter and be mistakenly included in the count. These challenges can be reduced using human inspection, but again human involvement may result in counting inaccuracies. In some existing counter design cases, the user is required to almost feed the objects one-at-a-time out of its bulk supply container into the counter, in order to insure accurate counting, thus defeating the purpose of having a counter.

The "global" automatic counting approach is based on a priori knowledge of a measurable property or attribute of an individual object. By measuring the cumulative or "global" attribute of "N" similar objects one can find the number of objects, N, in the group. Clearly, this requires that a measure of the attribute of a group of "N" similar objects is the superposition of the measure of the attribute of a single object, N-times. Weighing is one example of a global counting approach, where the total weight of a number of objects is compared to the weight of a single object, in order to find the number of objects in the group. Another example is the measure of area of a group of similar objects, obtained by an analog sensor, which is viewed as a superposition of the measure of the known area of a single object. This superposition principle is flawed because of the object-to-object variability due to manufacturing and the potential non-linearity in the sensor measuring the attribute, as well as the possible distorting effects due to the optics involved. Further, it has been found that, counter-intuitively, measuring the projection area attribute at higher resolution does not ensure the applicability of the superposition principle when using digital images of the projected area of a single object and a group of objects. Using pixel counting, where each pixel is a few micrometers in extent, the superposition did not apply all the time, as the size of the object was changed over a range of values, from small to large.

The feature/attribute identification-based automatic counting approach involves the inspection and search for a characteristic such as color, pattern, shape, etc., or a combination of these characteristics. The identification of the object is accomplished by a comparison to a database of characteristics. Furthermore, measuring the color of an object adds complexity and costs to the counting system, since more sophisticated standards are required for the illumination sources, the geometry of illumination and collection of the light reflected from the object. Also, a color image takes three times the storage memory required for a black and white image, and the processing time to determine the count is expected to be longer. Typically, the light sources used in color measurements are required to operate at a high color temperature, which generates heat. Heat needs to be vented by fans and shortens the life of the light source. As the source intensity declines, over time, the parameters of the color being measured will shift, thus causing loss of object identity and hence counting inaccuracies will occur.

As described above, object counting accomplished by manual, semi-automated, and automated counting techniques produce counting inaccuracies. These inaccuracies may result from, for instance, human error, multiple object feeding, broken object feeding, inclusion of foreign objects, or the inapplicability of the superposition principle. Compared to manual methods, automatic counting methods typically shorten the counting time by different degrees; however, counting errors are not eliminated. Manual or semi-automated (i.e., semi-manual) methods cause fatigue and stress and still leave the issue of human error unresolved. Furthermore, the "feed and sense" automatic methods often require maintenance of certain parts of the system to ensure efficient sensing and to prevent object cross contamination. Also, the "global" methods provide counting speed but suffer from inaccuracy.

Based on the foregoing, a need still exists for an improved object counting and identification verification system.

SUMMARY OF THE INVENTION

The shortcomings of the prior art are overcome and additional advantages are provided through the provision in one aspect of an object counting system. The object counting system includes, for instance, (1) at least one radiation source providing electromagnetic radiation; (2) a digital imaging unit for providing a digital image by detecting at least part of the electromagnetic radiation, the digital image including at least a digital representation of a plurality of objects to be counted, the plurality of objects being non-overlapping; (3) a radiation diffusing surface positioned between the digital imaging unit and the at least one radiation source, the radiation diffusing surface being exposed to the electromagnetic radiation substantially uniformly; (4) an object holding surface substantially transparent to the electromagnetic radiation, the object holding surface supporting the plurality of objects placed thereon to be counted automatically, and the object holding surface being supported by the radiation diffusing surface; and (5) a computing unit interfaced with the digital imaging unit for receiving the digital image, and including software for converting the digital image to a binary digital image, and for analyzing the binary digital image to automatically count the plurality of objects.

In a further aspect of the present invention, a object identification verification subsystem of an object counting system is provided that includes, for example, the above-described object counting system and (1) a supply container from which the plurality of objects are removed prior to being placed on the object holding surface; (2) a removable written request holder for placement on the radiation diffusing surface; (3) a written request for placement in the written request holder, the written request including information (i.e., first identification information) identifying objects whose count is requested by the written request; (4) an illumination source for illuminating the written request placed in the written request holder, thereby reflecting light from the written request to the digital imaging unit to facilitate generating a digital image of the written request; and (5) a bar code scanner for scanning a bar code associated with the supply container, the bar code including information (i.e., second identification information) identifying the plurality of objects removed from the supply container, wherein the computing unit receives and analyzes the digital image of the written request to extract the first identification information, wherein the computing unit receives the second identification information, and wherein the software compares the first identification information to the second identification information, thereby verifying if the plurality of objects removed from the supply container and placed on the object holding surface match the objects whose count is requested by the written request.

Methods of counting objects and verifying object identification corresponding to the above-summarized object counting and verification system are also described and claimed herein.

Various features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts a table summarizing types of object holding surfaces to be used with different combinations of object imaging methods and object irradiation methods, in accordance with one or more aspects of the present invention;

DETAILED DESCRIPTION

In accordance with an aspect of the present invention, an enhanced object counting and identification verification system is provided for facilitating automatic, accurate, efficient, and quick counts of objects, and verifying the identification of the counted objects. As one example, the object counting and verification system counts non-overlapping objects, any number of which may or may not be touching each other. Surfaces under the objects are irradiated, causing shadows to be cast by the objects. The shadows cast and a background of the objects are captured as a digital image by a digital imaging unit. The digital image is analyzed and converted to a binary image by the computer/software subsystem. The computer/software subsystem analyzes the binary image and data associated with the size of the objects counted, thereby determining a count of the objects. The count is determined irrespective of, or independent of, attributes of the objects, such as size, shape, color and other special features. The count is also determined without relying on attributes stored in a database or other medium, and without relying on knowledge of a measured attribute of one or more sample objects. To verify the identification of the counted objects, a digitally imaged written request including object identification information is compared to identification information from a scanned bar code associated with a container that supplies the objects to be counted.

Figure 1A:
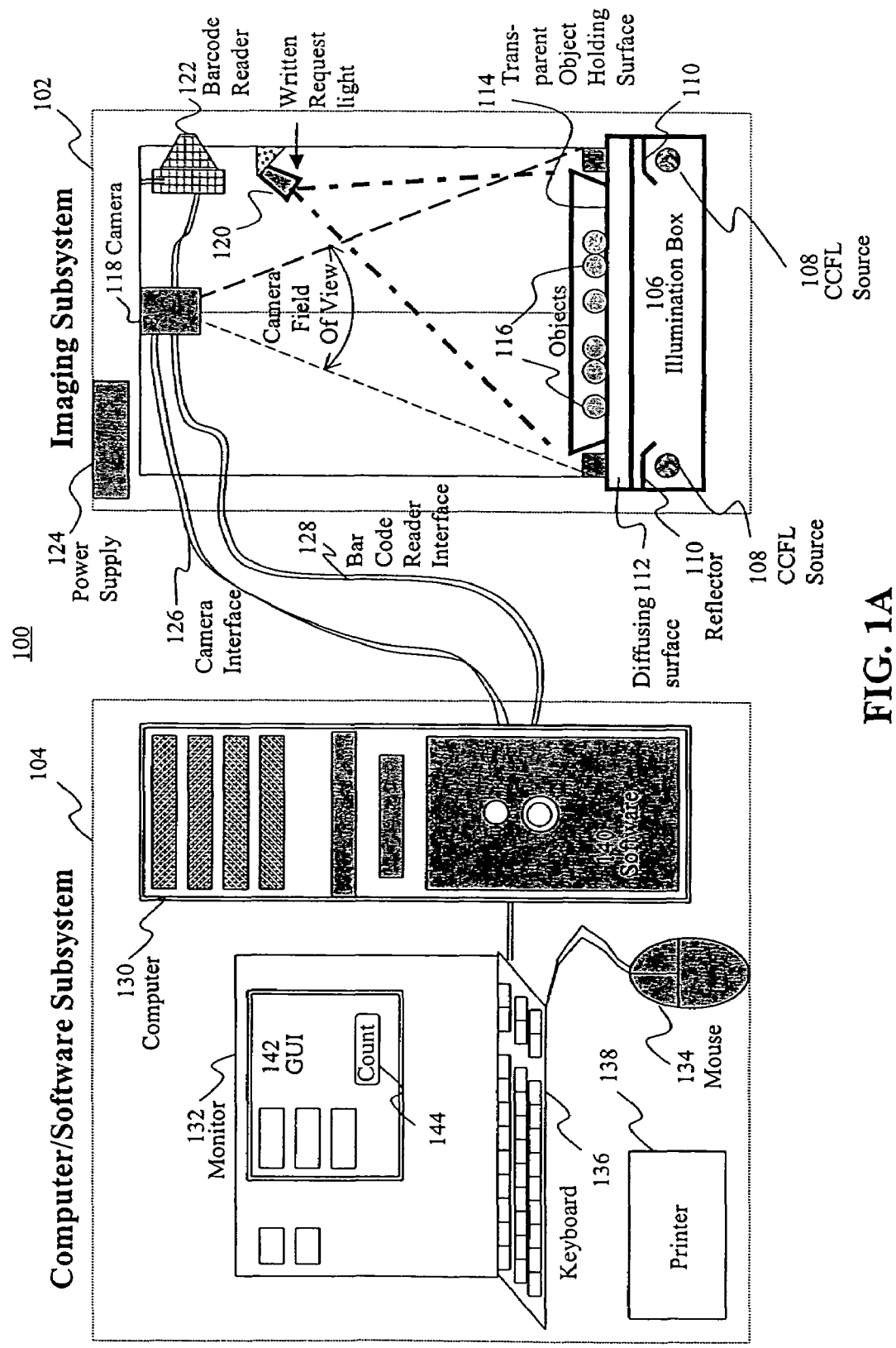
FIG. 1A depicts one embodiment of an object counting and verification system incorporating and using one or more aspects of the present invention.

One embodiment of an object counting and verification system incorporating and using one or more aspects of the present invention is depicted in FIG. 1A. FIG. 1A depicts an object counting and verification system 100, which includes two subsystems: imaging subsystem 102 and computer/software subsystem 104. Imaging subsystem 102 includes a radiation integrating cavity (a.k.a., illumination box) 106 having at least two sources 108 of electromagnetic radiation. Reflectors 110 are located near each of sources 108. A radiation diffusing surface (a.k.a., irradiated surface) 112 is disposed on radiation integrating cavity 106. Diffusing surface 112 includes an interior surface facing cavity 106 and an exterior surface opposite its interior surface. A transparent or substantially transparent object holding surface 114 is disposed on the exterior surface of diffusing surface 112. Surface 114 is transparent or substantially transparent to the electromagnetic radiation emitted from sources 108. Hereinafter, references to transparent object holding surface 114 are worded for simplicity, and still include surfaces that are transparent or substantially transparent. Objects 116 to be counted are disposed on object holding surface 114. Object holding surface 114 positions objects 116 in a field of view of digital imaging device 118. An illumination source 120 (e.g., low-power light source) provides illumination to a written request placed in a transparent holder that is described below relative to FIG. 1B. A bar code scanner (a.k.a., bar code reader) 122 has the capability to identify the objects to be counted by, for example, scanning a unique barcode available, for example, on a bulk supply container of the objects. Power supply 124 supplies power to radiation sources 108 and illumination source 120. Connections 126 and 128 provide interfaces between computer/software subsystem 104 and digital imaging unit 118 and bar code scanner 122, respectively.

Subsystem 104 includes a computing unit 130 (e.g., a conventional personal computer) interfaced to digital imaging unit 118 via connection 126, and to bar code scanner 122 via connection 128. In one embodiment, computing unit 130 is equipped with one or more standard peripherals such as a monitor 132, a mouse 134, a keyboard 136, and a printer 138, along with means (e.g., CD reader) for loading operating system and applications software 140 into subsystem 104. In one example, an operator uses PC 130 equipped with an operating system such as Windows 98 SE or XP offered by Microsoft, Inc., and operates the application software via a Graphical User Interface (GUI) 142, which facilitates the use of the counting/verification system and makes it user friendly. Operation of the application software provides a count 144 of objects 116 displayed on monitor 132.

Radiation integrating cavity 106 includes interior walls that cause diffusive, multiple internal reflections of radiation emanating from electromagnetic sources 108, while allowing part of the radiation to escape substantially uniformly into the exterior of the cavity through an exit opening covered with diffusing surface 112 (e.g., a glass or plastic surface), which diffusively transmits the radiation and directs the radiation toward transparent object holding surface 114. The shapes of radiation integrating cavity 106 and sources of radiation 108 are arbitrary. In FIG. 1A, a rectangular integrating cavity 106 is shown with cylindrical radiation sources 108 positioned parallel to two of the cavity's walls. This configuration efficiently uses the space inside subsystem 102 and lowers the manufacturing and assembly costs of the imaging subsystem enclosure and integrating cavity.

Electromagnetic radiation sources 108 provide, for example, a continuous exposure or a flash exposure of short duration to expose transparent object holding surface 114. In a preferred embodiment, electromagnetic radiation sources 108 are cold cathode fluorescent light (CCFL) sources positioned parallel to each other so that no radiation emanating from the CCFL sources directly reaches the interior surface of diffusing surface 112. This positioning insures that no "hot" regions develop behind objects 116. That is, the view of digital imaging unit 118 does not include a direct view of radiation emanating from source 108. If hot regions were allowed to develop, non-uniform irradiation of the objects' background would result. Reflector 110 associated with each source 108 includes diffusive surfaces, one surface facing associated source 108, and another facing the interior surface of diffusing surface 112. Reflectors 110 are positioned to insure that radiation emanating from sources 108 first experience at least one reflection at one of the surfaces inside the integrating cavity before reaching irradiated diffusing surface 112. Thus, light emanating from CCFL sources 108 bounces inside cavity 106, by reflections at the highly diffusive interior surfaces of the cavity. Eventually, a sufficient amount of light escapes, substantially uniformly, into the exterior of the cavity and provides the substantially uniform background illumination to objects 116.

The CCFL sources are highly efficient in converting electrical power to light and consume very low electrical power, thus minimizing heat generation, lowering operating cost, and increasing the life of the sources. CCFL sources consume less than one watt each in electrical energy, yet provide adequate intensity for imaging. The small diameter of the CCFL sources (3 mm) makes them suitable for cavities with small as well as large dimensions. Furthermore, the small diameter helps in conceptualizing the sources as cylindrically symmetric point sources, an assumption needed for a simple, yet efficient, way to model and study the cavity's design features that lead to better irradiation uniformity at diffusing surface 112. The spectral distribution of the radiation produced from sources 108 is compatible with diffusing surface 112, transparent object holding surface 114 and a sensing element of digital imaging unit 118 (e.g., a charged coupled device (CCD) array of a digital camera) in providing the irradiation intensity necessary to produce a high contrast image by the camera.

As one example, CCFL sources 108 and illumination source 120 are driven by power taken from a 120 VAC at 50/60 Hz source and converted to a 12 VDC power supply. A special inverter is used to drive the CCFL sources. A small bulb in illumination source 120 uses a 12 VDC power supply. The total electrical energy used by CCFL sources 108 and illumination source 120 is less than 3 Watts.

CCFL sources are merely an example of one type of electromagnetic radiation sources 108. Other types of sources, from which other types of electromagnetic radiation emanate, are contemplated by the present invention.

In one embodiment of the present invention, digital imaging unit 118 is a digital camera. The digital camera is one of the conventional CCD-based digital cameras available in the market for recreational or professional photography. The digital camera can also be a conventional camera used in digital microscopy. Higher cost CCD cameras are usually sensitive to color and provide high image resolution. That is, these cameras have a high number of pixels/linear inch of the CCD sensor, as well as advanced optics for focusing and/or zooming capabilities. A number of tradeoffs exist in selecting a digital camera, which include color vs. black/white, processing speed vs. resolution, automatic zooming vs. manual, etc. In a preferred embodiment, the digital camera is a low cost, low resolution (480 pixels×640 pixels) WebCam capable of producing black/white digital images. Since the present invention focuses on imaging the shadows of the objects, the 3 color-defining parameters of each pixel are not needed and only one intensity value is sufficient to capture a black/white digital image. This approach reduces the size of the image storage space to one third of that needed for a color image. Higher resolution cameras mean higher number of pixel intensity values for each digital image. Thus, using a black/white image at low resolution significantly reduces the time required to process the image produced by digital camera 118 to find the count of objects 116. Using the WebCam described above, an image can be processed in a few seconds. In another embodiment, the digital imaging unit is a linear lens array aligned with a linear photodiode array. An example of the linear lens array is a Selfoc lens array offered by Nippon Sheet Glass Company, Ltd., Osaka, Japan.

As radiation escapes cavity 106, it interacts with diffusing surface 112 according to the law of conservation of energy, which states that the total incident energy, before an interaction, equals the sum of the reflected, transmitted, and absorbed radiation energies after the interaction. That is, a part of the radiation reflects back into the interior of cavity 106 by diffusing surface 112, another part transmits through the diffusing surface towards object holding surface 114, slightly attenuated, and a third part is absorbed by the diffusing surface. Two similar interactions take place between the radiation and object holding surface 114, as well as between the radiation and objects 116. Thus, the energy leaving radiation integrating cavity 106 reaches digital imaging unit 118 with or without being modulated by the objects' absorption. The resulting radiation pattern captured by the digital imaging unit is a high contrast digital image, made of regions of high intensity (i.e., objects' background) and regions of lower intensity (i.e., objects' shadows). The digital image therefore requires no further image contrast enhancements. Since the captured digital image is a gray image, only a black and white sensing digital camera is required, which costs less than a color-sensing digital camera. The gray digital image is converted to a binary digital image. Processing a binary digital image minimizes the required image processing time to determine the objects' count. The preferred CCFL sources discussed above provide sufficient light for the system to produce the required high contrast binary image.

Connections 126, 128 between digital imaging unit 118 and computing unit 130 are, for example, Universal Serial Bus (USB) cables. These USB cables plug into the USB ports of computing unit 130 to communicate data, which includes the digital image provided by digital imaging unit 118 and the bar code scanned by bar code scanner 122, to computing unit 130. Data transfer via the USB cables is coordinated by software 140. The bar code scanned is described in detail below. Further, USB cables 126, 128 provide the power needed for the digital imaging unit and the barcode scanner operations. In another embodiment, USB cables 126, 128 are replaced by conventional wireless means to communicate the above-described data to computing unit 130. In this case, the electrical power needed by digital imaging unit 118 and bar code scanner 122 is supplied by power supply 124.

In a first embodiment (see FIG. 1A), transparent object holding surface 114, which keeps objects 116 to be counted in the field of view of digital imaging unit 118 (i.e., in an imaging position), is a removable tray having an exit (not shown) shaped so that it aids in collecting the objects, after counting, into a packaging container (e.g., the exit is a funnel-shaped handle). Only the surface (e.g., the bottom surface) of the tray carrying objects 116 to be counted need be transparent to the electromagnetic radiation emanating from sources 108. In this first embodiment, the tray carrying objects 116 is inserted into subsystem 102 for at least a short period of time (e.g., a few seconds) during the imaging of objects 116 by digital imaging unit 118. In this embodiment, digital imaging unit 118 is, for example, a digital camera that includes a CCD and images objects by using the CCD to detect radiation from sources 108.

In a second embodiment of the present invention, object holding surface 114 is a multiplicity of trays carried by a conveyor (not shown) or a rotary mechanism (not shown) and passing over diffusing surface 112 in a stop-and-go motion. The conveyor or rotary mechanism advances the trays and stops when each tray reaches an appropriate imaging position (i.e., in the field of view of the digital imaging unit), thereby allowing imaging subsystem 102 to be used in a production environment to count the objects in each tray. In these stop-and-go conveyor or rotary configurations, electromagnetic radiation sources 108 provide continuous exposure to be detected by, for example, a CCD-based digital camera.

In a third embodiment, also suitable for a production environment, a conveyor or rotary mechanism continuously moves trays holding objects 116, and digital imaging unit 118 is a CCD-based digital camera. This embodiment requires a short duration flash exposure of the radiation provided by sources 108. This flash exposure mode allows a sharp digital image to be captured by CCD-based digital camera 118, with almost no fuzzy edges developing at the edges of the objects normal to the direction of the continuous motion of the conveyor/rotary mechanism. The shorter the duration of the flash, the less visible this fuzzy edge effect will be.

In a fourth embodiment of this invention, which is again suitable for a production environment, trays holding objects 116 move continuously in uniform motion by a conveyor or rotary mechanism, and digital imaging unit 118 includes a linear lens array (e.g., Selfoc lens array), aligned with a linear photodiode array. In the fourth embodiment, the continuous motion of the trays is normal to the long dimension of the photodiode array. The motion of the trays is sufficiently smooth, having very low velocity flutter, to prevent image artifacts from developing in the digital image. In this embodiment, the Selfoc lens array and photodiode array replace the digital camera in the aforementioned embodiments, and sources 108 provide continuous exposure.

The combinations of object imaging methods and object irradiation methods discussed above relative to the first through fourth embodiments, and their associated object holding surface 114 configurations (e.g., manual tray, stop/go conveyor or rotary mechanism, and continuously moving conveyor or rotary mechanism) are summarized in table 300 depicted in FIG. 3.

Imaging subsystem 102 can be configured, alternatively, by swapping digital camera (or lens/photodiode arrays) 118 and integrating cavity 106 so that objects 116 remain in between the illumination cavity and the digital camera (or lens/photodiode arrays).

Figure 1B:
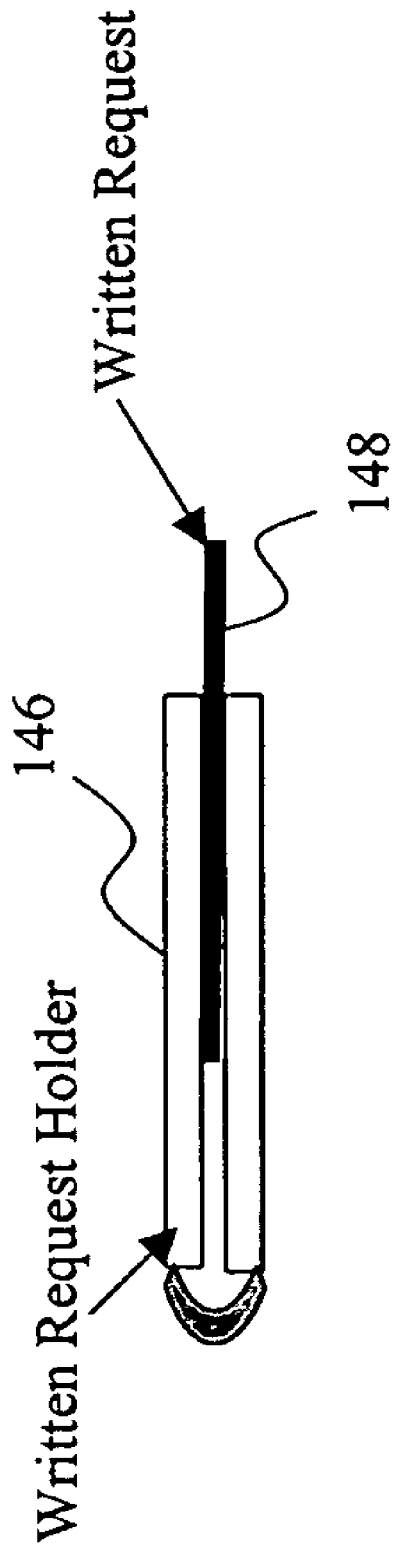
FIG. 1B depicts a written request holder, in accordance with one or more aspects of the present invention.

In a preferred embodiment of the present invention, object counting system 100 includes components for identifying objects 116 and verifying that identification. A transparent holder 146 depicted in FIG. 1B is placed in transparent object holding surface 114 (FIG. 1A) so that written information of a request 148 shown in FIG. 1B faces towards digital imaging unit 118 (FIG. 1A), thereby allowing the digital imaging unit to capture a legible digital image of request 148 using light originating at illumination source 120 (FIG. 1A) and reflected from written request 148 so that the light reaches digital imaging unit 118. Written request 148 includes, for example, information about the person making the request, identification of the kind of objects to be counted, the number of objects to be counted, etc.

To verify the identification of objects 116, the identification of objects 116 by written request 148 is checked against an identification using bar code scanner 122. Bar code scanner 122 is used to identify objects 116 to be counted by scanning, for instance, a unique bar code available on a supply container that originally supplies objects 116. This bar code identification is compared to identification information extracted from the digital image of written request 148 and input to computing unit 130 through keyboard 136, or by using Optical Character Recognition (OCR) and/or Intelligent Character Recognition (ICR) software. Software, residing in subsystem 104, compares the two identifications and warns the user if they do not match. A match of the two identifications serves as a verification that the objects removed from a supply bottle and placed on the object holding surface are also the objects requested by written request 148. The bar code scanner is any of a variety of conventional bar code scanners commercially available. In a preferred embodiment, the bar code scanner is triggered to scan a bar code pattern automatically.

Figure 2:
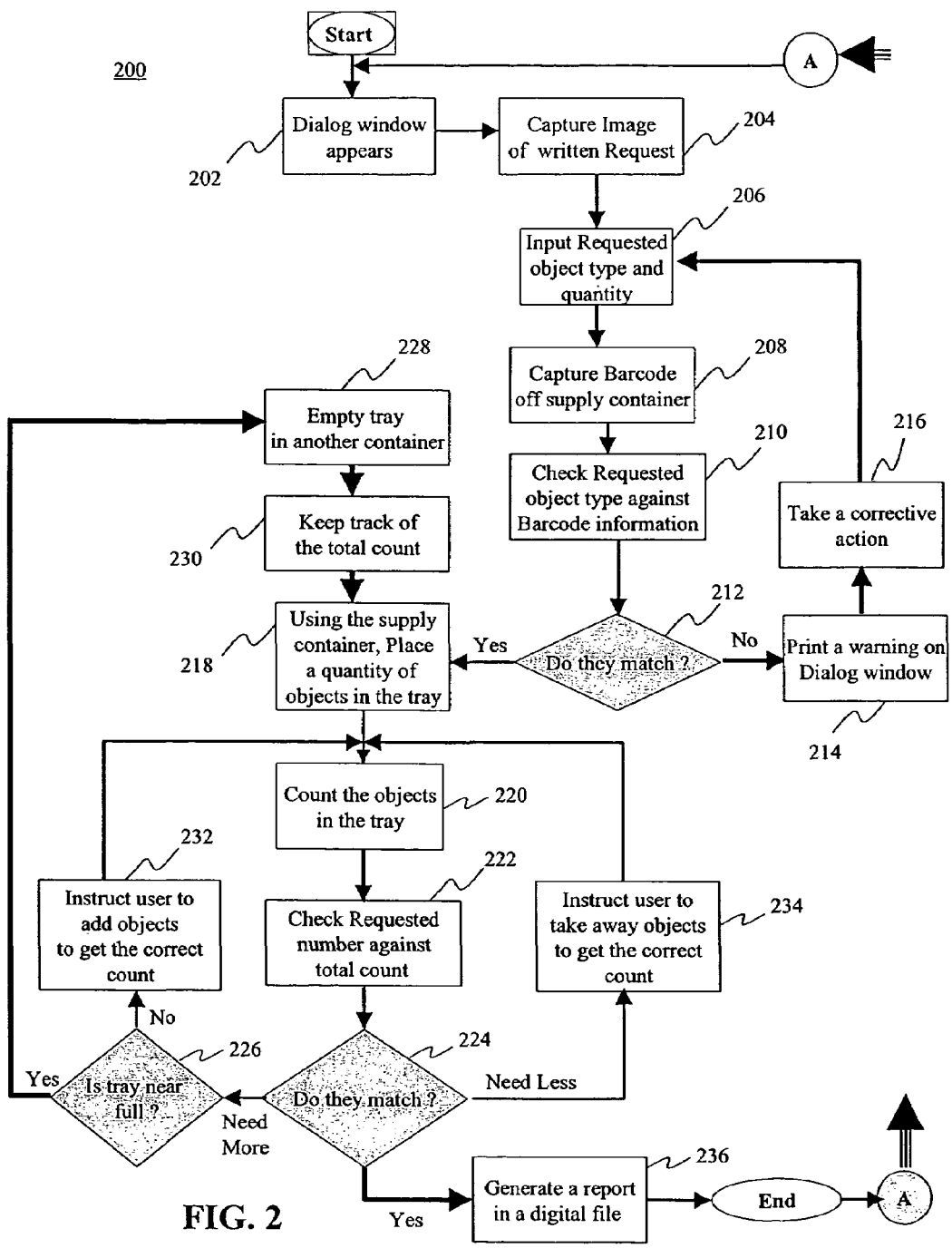
FIG. 2 depicts one embodiment of logic associated with counting objects and verifying identification of objects, in accordance with one or more aspects of the present invention.

FIG. 2 depicts a flow chart showing an automatic object counting and identification verification method 200 associated with the above-described object counting/verification system 100. The counting and verification process begins with a dialog window 202 appearing on monitor 132 (FIG. 1A). Information on written request 148 (FIG. 1B) is either captured 204 by digital imaging unit 118 (FIG. 1A), or is read by a user of object counting system 100 (FIG. 1A) and manually input 206 via keyboard 136 into computing unit 130 (FIG. 1A). If written request 148 is to be captured by digital imaging unit 118, the written request is placed in holder 146 (FIG. 1B) and positioned so that the request information faces the digital imaging unit. The request is illuminated by illumination source 120, allowing the digital imaging unit to capture a digital image of the request, after receiving a command from GUI 142 (FIG. 1A). The captured image is processed by software residing on computing unit 130, which performs Optical Character Recognition (OCR) and Intelligent Character Recognition (ICR) to convert the machine and/or hand written characters into computer text for storage in computing unit 130. The information captured manually or through the OCR/ICR interpretation of the written request will include at least the identity of the person who made the request, the type of objects 116 to be counted and the requested number of objects 116.

The bulk storage container of objects 116 is assumed to have an external bar code label, which uniquely identifies the type of objects stored in the container. The system user then presents, at close distance, the bar code to barcode scanner 122, which automatically scans 208 and interprets the bar code and stores it in text form in computing unit 130. A comparison 212 is then made, by application software 140, between the two identifications provided by the bar code and the written request, to verify that the identity of objects 116 being counted is the same as the identity of the objects requested. If the requested object identification differs from the object identification determined from the bar code scan, GUI 142 provides a warning 214 so that the system user can take corrective actions 216 and repeat the above-described steps starting at inputting 206 the requested object type and quantity.

If comparison 212 indicates a match between the requested object identification and the bar code identification, objects 116 are taken from a bulk supply container of the objects and placed 218 onto transparent object holding surface 114 (FIG. 1A) (e.g., tray), in a single layer format. Transparent object holding surface 114 carrying objects 116 is placed in the field of view of digital imaging unit 118. When the digital imaging unit is activated through GUI 142, it captures a still digital image of the objects' shadows as grayish pixels and the background regions surrounding the shadow as white pixels. The digital image thus captured possesses a very high contrast and no further contrast enhancement is required.

The captured image is communicated to computing unit 130 for digital image processing by special, proprietary software 140. The digital imaging processing software then performs a succession of operations summarized below:

(1) Black lines are removed at the frame boundaries and gray speckles in the image background are removed that are smaller than the smallest object to be counted. The captured gray image is converted into a binary (black and white) digital image using a threshold level to determine a conversion to black or white.

(2) The Distance Transform is applied to the binary image to find mutually non-intersecting regions in the objects, surrounding the center of mass of each object. The information found is used to count and segment any cluster of objects into single objects. As used herein, a cluster of objects is two or more objects that are in contact with (i.e., touching) each other.

(3) The approximate size of each individual object is determined and the mean size and standard deviation are found. A scatter plot is then generated containing the found individual sizes, their mean size and standard deviation. Sizes farther from the mean indicate possible broken objects or foreign objects. Foreign objects are objects mistakenly included in the objects to be counted.

Using an analysis of the binary image, the system counts 220 the objects in just a few seconds. The requested number of objects is checked 222 against the count determined by the system. The GUI is used to inform the user of the number 144 (FIG. 1A) of objects presented in the field of view of the digital imaging unit and displays whether the found number of objects is less than, equal to, or greater than the requested number. In comparison 224, if the count does not match the requested number of objects, and the number of objects on the object holding surface needs to be increased, the fullness of the object holding surface is checked 226. If the object holding surface is nearly full, it is emptied into another container 228, the total count is tracked 230, and the above-described steps are repeated starting at placing 218 objects from the supply container onto the object holding surface. Returning to check 226 of the fullness of object holding surface, if the tray is not nearly full, the user is instructed to add 232 objects to obtain the correct count, and the process continues with the above-described step 220 of counting the objects on the object holding surface. Returning to comparison 224, if the count does not match the requested number of objects, and the number of objects on the holding surface needs to be decreased, the user is instructed to remove objects to obtain the correct count 234, and the process continues with the above-described step 220 of counting the objects. Returning again to comparison 224, if the count matches the requested number of objects, a final record 236 is generated by the system. The final record consolidates an image of the objects, their counted number, the associated bar code identification and the image of the written request. The consolidated record is stored in an electronic computer file for future reference and can be printed on paper, if needed. After the final record is generated, dialog window 202 appears again and the object counting process can be repeated.

Advantageously, the object counting and verification system described above provides an accurate, time-saving and less stressful counting system for high counts and/or repeated counts, when compared to manual techniques. The present invention takes into account manufacturing variability in objects by allowing the counting of objects irrespective of object attributes, such as size, shape, color, and surface patterns. The claimed object counting system does not rely on attributes stored, for example, in a database, nor does it rely on knowledge of a measured attribute of a single object or sample of objects. Further, the claimed system is inherently reliable and free of audible noise, because it has no moving parts, except for the object holding surface. Still further, the counting is initiated and performed automatically after placing the object holding surface, which carries the objects to be counted, on the radiation diffusing surface.

Yet further, the claimed invention utilizes black and white imaging, rather than color, thereby reducing cost, simplifying system design, saving computer storage space, improving energy efficiency, and significantly reducing the time required to process an image and determine a count. Accurate object recognition and counting based on knowledge of color imposes very strong restrictions on the choice of the light sources used, the uniformity of the light at the object plane and the geometry for sensing the color in reflection mode. For accurate identification of color, the light source must conform to rigorous standards regarding its color temperature or spectral distribution, thus increasing the cost of the source and supporting power supply. The typically high color temperature of the source requires large amounts of electrical energy and generates heat, thereby shortening the life of the source and requiring means for air ventilation. The high degree of uniformity calls for costly and sophisticated reflector design around the source. Furthermore, in color measurements, the object-source-sensor triad must conform to a strict geometrical configuration standard, which complicates and increases the cost of the design. Shape as well as other special features in a single object, stored in a database of colored images, implies long processing time, mostly consumed in image capturing, features extracting, and comparisons with elements in the database. This is particularly made more difficult when the objects are touching each other during imaging. Use of color can further impose requirements such as anti-reflective coatings on light-reflecting surfaces in the system, and special treatments of the objects' background to enhance image contrast. This further increases the processing time and increases the cost of manufacturing.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An object counting system for counting non-overlapping objects, said system comprising:
   at least one radiation source providing electromagnetic radiation;
   a digital imaging unit for providing a digital image by detecting at least part of said electromagnetic radiation, at least part of said digital image being associated with a plurality of objects to be counted, said plurality of objects being non-overlapping;
   a radiation diffusing surface positioned between said digital imaging unit and said at least one radiation source, said radiation diffusing surface being exposed to said electromagnetic radiation substantially uniformly;
   an object holding surface substantially transparent to said electromagnetic radiation, said object holding surface supporting said plurality of objects placed thereon to be counted automatically, and said object holding surface being supported by said radiation diffusing surface; and
   a computing unit interfaced with said digital imaging unit for receiving said digital image, and including software for converting said digital image to a binary digital image, and for analyzing said binary digital image to automatically count said plurality of objects, wherein said software for analyzing said binary digital image employs a Distance Transform to segment clusters of objects of said plurality of objects and to count said plurality of objects.

2. The system of claim 1, wherein said electromagnetic radiation includes at least a first portion and a second portion,
   wherein said first portion interacts with said plurality of objects, thereby generating regions (shadow regions) associated with each object of said plurality of objects, said shadow regions being directed toward said digital imaging unit, and said shadow regions being associated with one or more intensity levels of said electromagnetic radiation,
   wherein said second portion passes through regions (background regions) of said object holding surface to said digital imaging unit without interacting with said plurality of objects, said background regions being associated with one or more intensity levels of said electromagnetic radiation,
   wherein said one or more intensity levels associated with said shadow regions are lower than said one or more intensity levels associated with said background regions, and
   wherein said digital image includes a digital representation of said one or more intensity levels associated with said shadow regions and said background regions.

3. The system of claim 2, wherein said binary digital image includes a first binary state and a second binary state, and
   wherein said converting to said binary digital image includes converting said one or more intensity levels associated with said shadow regions to said first binary state and converting said one or more intensity levels associated with said background regions to said second binary state.

4. The system of claim 1, wherein said plurality of objects are counted irrespective of attributes of said objects, said attributes including at least shape, color and size of said objects.

5. The system of claim 1, wherein said plurality of objects are counted without employing a priori knowledge of attributes of said plurality of objects, and without deriving attributes from a sample of said plurality of objects.

6. The system of claim 1, wherein said automatic count of said plurality of objects is initiated by said plurality of objects being placed on said object holding surface, and said object holding surface being placed on said diffusing surface.

7. The system of claim 1, wherein said at least one radiation source includes a plurality of electromagnetic radiation sources.

8. The system of claim 7, wherein said plurality of electromagnetic radiation sources includes two cold cathode fluorescent light (CCFL) sources.

9. The system of claim 1, wherein said software for analyzing said binary digital image determines approximate sizes of said plurality of objects, a mean size of the determined sizes, and a standard deviation associated with the determined sizes to facilitate identifying fragments of objects of said plurality of objects, and identifying foreign objects counted by said software, wherein said foreign objects are mistakenly included in said plurality of objects to be counted.

10. The system of claim 1, further comprising a radiation integrating cavity disposed under said radiation diffusing surface,
wherein said electromagnetic radiation sources reside in said cavity,
wherein said radiation integrating cavity includes interior surfaces to provide diffusive and multiple reflections of said electromagnetic radiation within said cavity, and
wherein said reflections facilitate said radiation diffusing surface being substantially uniformly exposed to said electromagnetic radiation.

11. The system of claim 1, wherein said digital imaging unit is selected from a group consisting of a digital camera and a linear lens array aligned with a linear photodiode array.

12. The system of claim 1, wherein said object holding surface comprises a tray, said tray being removable from said radiation diffusing surface, and wherein said radiation sources provide radiation exposure to said radiation diffusing surface by continuous exposure or by flash exposure.

13. An object counting system for counting non-overlapping objects, said system comprising:
at least one radiation source providing electromagnetic radiation;
a digital imaging unit for providing a digital image by detecting at least part of said electromagnetic radiation, at least part of said digital image being associated with a plurality of objects to be counted, said plurality of objects being non-overlapping;
a radiation diffusing surface positioned between said digital imaging unit and said at least one radiation source, said radiation diffusing surface being exposed to said electromagnetic radiation substantially uniformly;
an object holding surface substantially transparent to said electromagnetic radiation, said object holding surface supporting said plurality of objects placed thereon to be counted automatically, and said object holding surface being supported by said radiation diffusing surface;
a computing unit interfaced with said digital imaging unit for receiving said digital image, and including software for converting said digital image to a binary digital image, and for analyzing said binary digital image to automatically count said plurality of objects
wherein said motion of said plurality of trays is provided by an apparatus selected from a group consisting of a moving conveyor and a rotary mechanism,
wherein said motion of said plurality of trays is selected from a group consisting of stop-and-go motion and continuous uniform motion,
wherein radiation sources provide radiation exposure to said radiation diffusing surface by continuous exposure, if said digital imaging unit includes lens and photodiode arrays and said motion of said trays is said continuous uniform motion, or
if said digital imaging unit is a CCD-based digital camera and said motion of said trays is said stop-and-go motion, and
wherein radiation sources provide radiation exposure to said radiation diffusing surface by flash exposure if said digital imaging unit is a CCD-based digital camera and said motion of said trays is said continuous uniform motion.

14. The system of claim 1, wherein said plurality of objects are removed from a supply container prior to being placed on said object holding surface, and wherein said system further comprises an object identification verification subsystem, said verification subsystem comprising:
a removable transparent written request holder for placement on said radiation diffusing surface;
a written request for placement in said written request holder, said written request including information (first identification information) identifying objects whose count is requested by said written request;
an illumination source for illuminating said written request placed in said written request holder, thereby reflecting light from said written request to said digital imaging unit to facilitate generating a digital image of said written request; and
a bar code scanner for scanning a bar code associated with said supply container, said bar code including information (second identification information) identifying said plurality of objects removed from said supply container,
wherein said computing unit receives and analyzes said digital image of said written request to extract said first identification information,
wherein said computing unit receives said second identification information, and
wherein said software compares said first identification information to said second identification information, thereby verifying if said plurality of objects removed from said supply container and placed on said object holding surface match said objects whose count is requested by said written request.

15. A method of counting non-overlapping objects, said method comprising:
placing a plurality of non-overlapping objects on a substantially transparent object holding surface to automatically count said objects, said object holding surface supported by a radiation diffusing surface disposed between a digital imaging unit and at least one radiation source;
providing, by said at least one radiation source, electromagnetic radiation to expose said radiation diffusing surface substantially uniformly;
detecting at least part of said electromagnetic radiation by a digital imaging unit to provide a digital image, at least part of said digital image being associated with said plurality of objects to be counted;
receiving, by a computing unit interfaced with said digital imaging unit, said digital image;
converting, by software included in said computing unit, said digital image to a binary digital image; and
analyzing, by said software, said binary digital image to automatically count said plurality of objects, wherein said analyzing by said software employs a Distance Transform to segment clusters of objects of said plurality of objects and to count said plurality of objects.

16. The method of claim 15, wherein said electromagnetic radiation includes at least a first portion of electromagnetic radiation and a second portion of electromagnetic radiation,
wherein said first portion interacts with said plurality of objects, thereby generating regions (shadow regions) associated with each object of said plurality of objects, said shadow regions being directed toward said digital imaging unit, and said shadow regions being associated with one or more intensity levels of said electromagnetic radiation, wherein said second portion passes through regions (background regions) of said object holding surface to said digital imaging unit without interacting with said plurality of objects, said background regions being associated with one or more intensity levels of said electromagnetic radiation, wherein said one or more intensity levels associated with said shadow regions are lower than said one or more intensity levels associated with said background regions, and wherein said digital image includes a digital representation of said one or more intensity levels associated with said shadow regions and said background regions.

17. The method of claim 16, wherein said binary digital image includes a first binary state and a second binary state, and wherein said converting to said binary digital image includes converting said one or more intensity levels associated with said shadow regions to said first binary state and converting said one or more intensity levels associated with said background regions to said second binary state.

18. The method of claim 15 wherein said plurality of objects are counted irrespective of attributes of said objects, said attributes including at least shape, color and size of said objects.

19. The method of claim 15, wherein said plurality of objects are counted without employing a priori knowledge of attributes of said plurality of objects, and without deriving attributes from a sample of said plurality of objects.

20. The method of claim 15, wherein said automatic count of said plurality of objects is initiated by said placing said plurality of objects on said object holding surface, and placing said object holding surface on said diffusing surface.

21. The method of claim 15, wherein said at least one radiation source includes a plurality of electromagnetic radiation sources.

22. The method of claim 21, wherein said plurality of electromagnetic radiation sources includes two cold cathode fluorescent light (CCFL) sources.

23. The method of claim 15, wherein said software for analyzing said binary digital image determines approximate sizes of said plurality of objects, a mean size of the determined sizes, and a standard deviation associated with the determined sizes to facilitate identifying fragments of objects of said plurality of objects, and identifying foreign objects counted by said software, wherein said foreign objects are mistakenly included in said plurality of objects to be counted.

24. The method of claim 15, wherein providing said electromagnetic radiation further comprises providing said electromagnetic radiation in a radiation integrating cavity disposed under said radiation diffusing surface, wherein said electromagnetic radiation sources reside in said cavity, wherein said radiation integrating cavity includes interior surfaces to provide diffusive and multiple reflections of said electromagnetic radiation within said cavity, and wherein said reflections facilitate said radiation diffusing surface being substantially uniformly exposed to said electromagnetic radiation.

25. The method of claim 15, wherein said detecting to provide a digital image further comprises detecting by a digital imaging unit selected from a group consisting of a digital camera and a linear lens array aligned with a linear photodiode array.

26. The method of claim 15, wherein said placing further comprises placing said plurality of objects on tray, said tray including said object holding surface, said tray being removable from said radiation diffusing surface, and wherein said radiation sources provide radiation exposure to said radiation diffusing surface by continuous exposure or by flash exposure.

27. A method of counting non-overlapping objects, said method comprising:

placing a plurality of non-overlapping objects on a substantially transparent object holding surface to automatically count said objects, said object holding surface supported by a radiation diffusing surface disposed between a digital imaging unit and at least one radiation source;

providing, by said at least one radiation source, electromagnetic radiation to expose said radiation diffusing surface substantially uniformly;

detecting at least part of said electromagnetic radiation by a digital imaging unit to provide a digital image, at least part of said digital image being associated with said plurality of objects to be counted;

receiving, by a computing unit interfaced with said digital imaging unit, said digital image;

converting, by software included in said computing unit, said digital image to a binary digital image;

analyzing, by said software, said binary digital image to automatically count said plurality of objects, wherein said motion of said plurality of trays is provided by an apparatus selected from a group consisting of a moving conveyor and a rotary mechanism, wherein said motion of said plurality of trays is selected from a group consisting of stop-and-go motion and continuous uniform motion, wherein said radiation sources provide radiation exposure to said radiation diffusing surface by continuous exposure, if said digital imaging unit includes lens and photodiode arrays and said motion of said trays is said continuous uniform motion, or if said digital imaging unit is a CCD-based digital camera and said motion of said trays is said stop-and-go motion, and wherein said radiation sources provide radiation exposure to said radiation diffusing surface by flash exposure if said digital imaging unit is a CCD-based digital camera and said motion of said trays is said continuous uniform motion.

28. The method of claim 15, further comprising:

removing said plurality of objects from a supply container prior to being placed on said object holding surface; and verifying identifications of a plurality of objects requested and said plurality of objects counted, wherein said verifying comprises:

placing a written request in a removable transparent written request holder, said written request including information (first identification information) identifying objects whose count is requested by said written request;

lighting, by an illumination source, said written request placed in said written request holder, thereby reflecting light from said written request to said digital imaging unit;

generating, by said digital imaging unit, a digital image of said written request;

scanning, by a bar code scanner, a bar code associated with said supply container, said bar code including information (second identification information) identifying said plurality of objects removed from said supply container;

receiving and analyzing, by said computing unit, said digital image of said written request to extract said first identification information;

receiving, by said computing unit, said second identification information; and comparing, by said software, said first identification information to said second identification information, thereby verifying if said plurality of objects removed from said supply container and placed on said object holding surface match said objects whose count is requested by said written request.

* * * * *

UNITED STATES PATENT AND TRADEMARK OFFICE
CERTIFICATE OF CORRECTION

PATENT NO.        : 7,570,786 B2
APPLICATION NO. : 10/929293
DATED             : August 4, 2009
INVENTOR(S)       : Antoun Ateya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this

Seventh Day of September, 2010

David J. Kappos
*Director of the United States Patent and Trademark Office*